US007353749B2

(12) United States Patent
Hamasagar

(10) Patent No.: US 7,353,749 B2

(45) Date of Patent: Apr. 8, 2008

(54) PISTON RETENTION APPARATUS AND METHOD

(75) Inventor: Arun M Hamasagar, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 326 days.

(21) Appl. No.: 11/106,916

(22) Filed: Apr. 15, 2005

(65) Prior Publication Data

US 2006/0245962 A1 Nov. 2, 2006

(51) Int. Cl.
*F16J 1/00* (2006.01)

(52) U.S. Cl. ........................................................ 92/255

(58) Field of Classification Search .................. 92/128, 92/187, 216, 255; 29/888.05, 888.051; 403/294, 403/355, 379.5

See application file for complete search history.

(56) References Cited

U.S. PATENT DOCUMENTS

| | | | |
|---|---|---|---|
| 1,440,801 A | 1/1923 | Shoemaker | |
| 2,829,503 A | 4/1958 | Hayes | |
| 3,065,734 A | 11/1962 | Molzahn | |
| 3,489,442 A | 1/1970 | Wright | |
| 3,528,346 A | 9/1970 | Lee | |
| 3,808,956 A | 5/1974 | Knapp | |
| 3,955,479 A | 5/1976 | McLuckie | |
| 3,968,862 A | 7/1976 | Gorges et al. | |
| 4,197,786 A | 4/1980 | Pillon | |
| 5,042,332 A * | 8/1991 | Nickipuck | 403/379.5 |
| 5,904,440 A | 5/1999 | Sims | |
| 6,032,569 A | 3/2000 | Armo | |
| 6,382,081 B2 | 5/2002 | Tanaka et al. | |
| 2002/0170426 A1 | 11/2002 | Braatz | |
| 2003/0140784 A1 | 7/2003 | Schollin | |

* cited by examiner

*Primary Examiner*—Michael Leslie
(74) *Attorney, Agent, or Firm*—D. James Barnes; Jeff A. Greene

(57) ABSTRACT

An apparatus and method for coupling a piston member to a rod member to create a piston and rod assembly are provided. The piston and rod assembly may include a piston member having a longitudinal bore and first and second retaining passages in communication with and extending away from the bore. The piston and rod assembly may further include a rod member having a third retaining passage arranged therein, a portion of the rod member being received within the bore of the piston member so that the third retaining passage is arranged within the bore in an offset configuration relative at least one of the first and second retaining passages. The piston and rod assembly may further include a retaining member arranged within the first and second retaining passages of the piston member and the third retaining passage of the rod member.

30 Claims, 1 Drawing Sheet

PISTON RETENTION APPARATUS AND METHOD

TECHNICAL FIELD

The present invention relates generally to a piston and rod assembly and more particularly to an apparatus and method for coupling together a piston and a rod.

BACKGROUND

Hydraulic cylinder arrangements typically include a piston member coupled to a rod member to form a piston and rod assembly. Various coupling arrangements have been used in the past to couple a piston member to a rod member.

For example, in a standard piston and rod assembly, a rod member is provided having a reduced-diameter threaded end. A piston member is provided having a longitudinal bore therethrough, the longitudinal bore having a diameter slightly larger than the reduced-diameter threaded end of the rod member. The longitudinal bore extends through the piston member from a first longitudinal end of the piston member to a second longitudinal end thereof and, toward the second longitudinal end of the piston member, opens into a wider-diameter counterbore. During assembly of the piston member with the rod member, the reduced-diameter threaded end of the rod member is inserted into the first end of the longitudinal bore of the piston member until the threaded end of the rod member extends into the wider-diameter counterbore of the piston member. A nut is placed within the counterbore of the piston member and tightened onto the threaded end of the rod member to tightly couple the piston member to the rod member.

Another piston and rod assembly is described in U.S. Pat. No. 5,904,440, issued to Sims. The '440 patent discloses a piston and rod assembly including a rod having a reduced-diameter threaded end and having a transverse opening extending through the reduced-diameter threaded end. Also disclosed is a piston having a longitudinal bore therethrough, the longitudinal bore having internal threads therein for engaging the threads on the rod. A transverse opening, intersecting the longitudinal bore, is also provided through the piston. During assembly, the reduced-diameter threaded end of the rod is screwed into the threaded longitudinal bore of the piston until the transverse opening in the rod is aligned with the transverse opening in the piston. A pin, for preventing further rotation of the rod relative the piston, is then seated within the aligned transverse openings of the rod and piston. Since there are no stressed areas on the rod or the piston upon insertion of the pin into the transverse openings, the pin is retained within the transverse openings of the rod and the piston via a retaining seal, which is disposed about the circumference of the piston and which is positioned to cover the transverse opening in the piston.

Prior piston and rod assemblies may rely substantially upon engagement between threaded portions of a piston and rod assembly for coupling a piston member and a rod member together. Reducing or eliminating such reliance may facilitate stronger or otherwise more practical or economical structural configurations than provided with prior coupling arrangements.

The present invention is directed at overcoming one or more disadvantages associated with prior piston and rod assemblies.

SUMMARY OF THE INVENTION

In one aspect of the present invention, a piston and rod assembly for use with an actuating device is provided. The piston and rod assembly may include a piston member having a longitudinal bore and first and second retaining passages in communication with and extending away from the bore. The piston and rod assembly may further include a rod member having a third retaining passage arranged therein, a portion of the rod member being received within the bore of the piston member so that the third retaining passage is arranged within the bore in an offset configuration relative at least one of the first and second retaining passages. The piston and rod assembly may further include a retaining member arranged within the first and second retaining passages of the piston member and the third retaining passage of the rod member.

In another aspect of the present invention, a method of coupling a piston member having a bore and at least a first retaining passage with a rod member having at least a second retaining passage is provided. The method may include inserting a portion of the rod member into the bore of the piston member so that the at least a first retaining passage is arranged in a predetermined offset configuration relative the at least a second retaining passage. The method may further include inserting a substantially rigid retaining member into the at least a first retaining passage and the at least a second retaining passage while substantially maintaining the offset configuration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings.

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Figure 1:
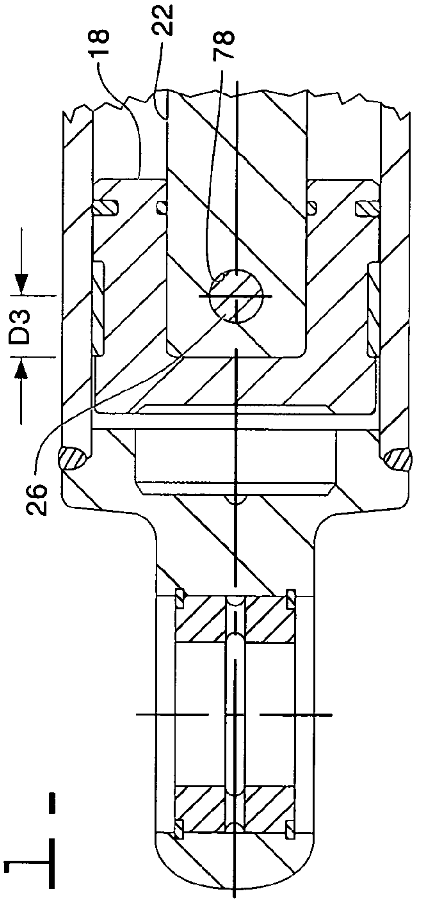
FIG. 1 is a partial front cross-sectional view of a cylinder assembly constructed and operable according to an embodiment of the present invention.

Referring to FIG. 1, an exemplary embodiment of the present invention may include a cylinder assembly 10 having a piston and rod assembly 14 therein. The piston and rod assembly 14 may include a piston member 18, a preferably cylindrical rod member 22, and a retaining member 26.

The piston member 18 may have a piston bore 30 formed longitudinally therein. The piston bore 30 may be substantially cylindrical in shape, may have a predetermined depth D1, and may terminate at a piston shoulder 34 formed on an internal transverse face of the piston member 18.

The piston member 18 may further include retaining passages 38*a*, 38*b* in communication with and extending radially outwardly, or away from, the piston bore 30. The retaining passages 38*a*, 38*b* may be generally cylindrical in shape and may be arranged in at least substantial alignment with each other. In the embodiment of FIG. 1, the retaining passages 38*a*, 38*b* are arranged at a longitudinal distance D2 from the piston shoulder 34, along transverse axis A.

A seal groove 42 may be formed about the outer circumference of the piston member 18, and a seal member 46, or wear band, may be seated therein for sealingly engaging an inner surface 58 of the cylinder body 62. The seal groove 42 may be positioned about the piston member 18 to intersect the first and second retaining passages 38*a*, 38*b*. Thus, the seal member 46 may be arranged within the seal groove 42 to effectively close the outer openings of the retaining passages 38*a*, 38*b*. An additional seal groove 50 may be disposed about the outer circumference of the piston member 18, and a seal member 54 may be seated therein for sealingly engaging an inner surface 58 of the cylinder body 62. A third seal groove 66 may be arranged within an internal wall of the piston bore 30, and a seal member 70 may be seated therein for sealingly engaging an outer surface of the rod member 22 to prevent high pressure fluid from within a fluid chamber 74 of the cylinder assembly 10 from passing between the rod member 22 and the piston bore 30. Thus, the seal member 70 acts to prevent the high pressure fluid from entering the retaining passages 38*a*, 38*b* and escaping to the other longitudinal side of the piston member 18 into an opposing fluid chamber 88.

A portion of the rod member 22 may be received within the piston bore 30. A rod shoulder 82 may be formed on the rod member 22, for example at an end of the rod member 22 on a transverse rod face 84. The rod shoulder 82 may be configured and arranged to abut and engage the piston shoulder 34 when the rod member 22 is received within the piston bore 30 and coupled with the piston member 18.

The rod member 22 may further include a retaining passage 78 arranged therein, for example, in a substantially transverse orientation relative the length of the rod member 22. The retaining passage 78 may be generally cylindrical in shape, may have substantially the same diameter as retaining passages 38*a*, 38*b*, and may be arranged at a longitudinal distance D3 (FIG. 2) from the rod shoulder 82. In the embodiment shown in FIGS. 1 and 2, the distance D3 is a predetermined distance longer than the distance D2 for reasons explained hereinbelow.

It should be appreciated that the portion of the rod member 22 received within the piston bore 30 may have at least substantially the same dimensions, e.g., outer diameter, as the portion of the rod member 22 not disposed within the piston bore 30. The outer diameter of the portion of the rod member 22 received within the piston bore 30 may preferably be sized for a slide fit configuration relative the piston bore 30.

A retaining member 26 may be arranged within at least one of the retaining passages 38*a*, 38*b* and within the retaining passage 78. In one embodiment, the retaining member 26 may be formed from a substantially rigid material, such as steel or the like, may have a tensile strength at least 1.3 times that of the maximum stresses likely to be encountered during operation of the piston and rod assembly 14, and the outer surface of the retaining member 26 may be heat treated to attain the desired tensile strength. The retaining member 26 may be shorter than the internal diameter of the seal groove 42 so that the retaining member 26 may be fully received within the retaining passages 38*a*, 38*b*, 78 without puncturing or otherwise interfering with the seal member 46.

INDUSTRIAL APPLICABILITY

The present invention may facilitate a relatively easy assembly process, while providing a robust coupling mechanism and method for a piston and rod assembly 14.

During assembly, the rod member 22 may be inserted into the piston bore 30 of the piston 18 until the rod shoulder 82 engages the piston shoulder 34. The rod member 22 may then be rotated so that the retaining passage 78 is generally angularly aligned relative the retaining passages 38*a*, 38*b*. As briefly referenced above, however, even when the rod member 22 is sufficiently inserted within the piston bore 30 so that the rod shoulder 82 engages the piston shoulder 34 and so that the retaining passage 78 is generally angularly aligned with the retaining passages 38*a*, 38*b*, the retaining passage 78 will not, in the illustrated embodiment, be exactly longitudinally aligned with the retaining passages 38*a*, 38*b*. Instead the retaining passage 78 will be offset from the retaining passages 38*a*, 38*b*, for example by a predetermined longitudinal offset distance, which may be equal to the difference between D3 minus D2. The offset distance preferably will be a sufficiently small distance to allow forced insertion—for example using appropriate tooling—of the retaining member 26 into one of the retaining passages 38*a*, 38*b*, through the retaining passage 78, and preferably into the other of the retaining passages 38*a*, 38*b*.

Due to the offset configuration of the retaining passage 78 relative at least one of the retaining passages 38*a*, 38*b*, the preferably substantially rigid nature of the retaining member 26, and/or the interaction between the rod shoulder 82 and the piston shoulder 34, a pre-load shear stress may be induced upon the retaining member 26. It should be appreciated that a pre-load shear stress may be characterized as a shear stress induced upon the retaining member 26 distinct from shear stress caused by an application of external loading on the piston and rod assembly 14. It should further be appreciated that such external loading may be caused, for example, by pressurized fluid within the cylinder assembly 10 and/or an external force acting on the piston and rod assembly 14.

The described configuration of the piston and rod assembly 14 preferably will cause a biasing force to be applied within the piston-rod joint 15 that biases the rod shoulder 82 toward the piston shoulder 34. It should be appreciated that the offset distance may be pre-determined to cause a desired pre-load condition within the piston-rod joint 15. In one embodiment, for example, the offset distance may be in the range of about 0.08 mm to about 0.1 mm.

Figure 2:
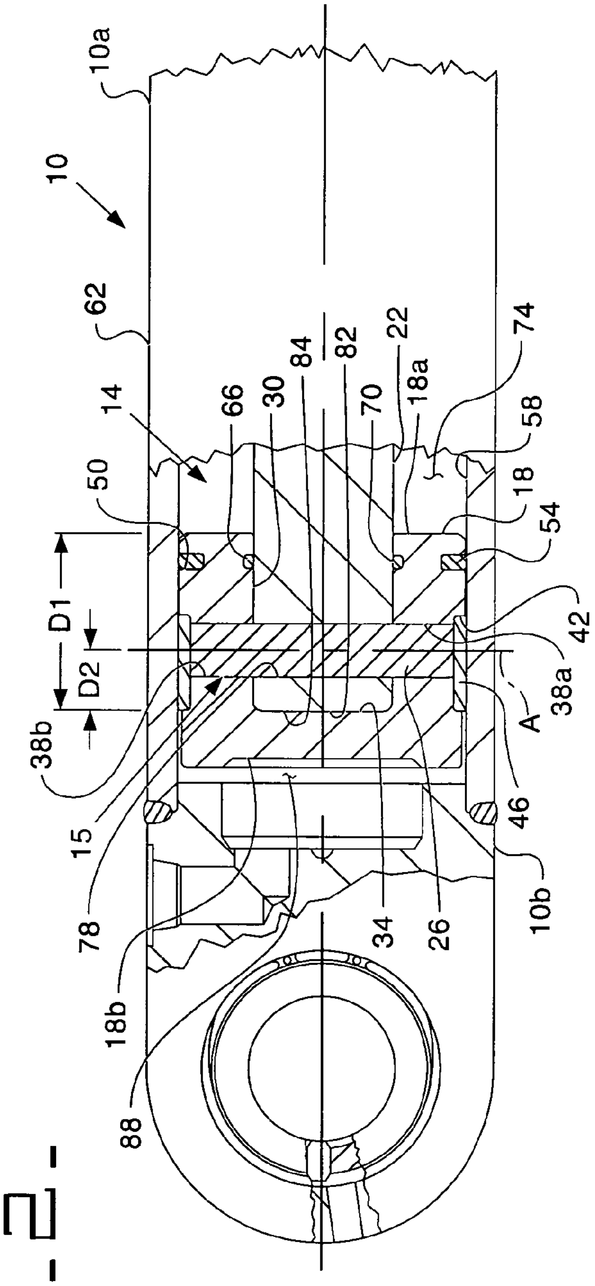
FIG. 2 is a partial bottom cross-sectional view of the cylinder assembly of FIG. 1.

While a piston and rod assembly having a press fit configuration between the rod member and the piston bore may be envisioned in an alternative embodiment of the present invention, the piston and rod assembly 14 described hereinabove and illustrated in FIGS. 1 and 2 may facilitate an easier disassembly process than a coupling mechanism having a press fit arrangement. For example, during assembly of the embodiment described hereinabove, the seal member 46 may be removed from the seal groove 42 to allow forced removal of the retaining member 26—for example using appropriate tooling—from the retaining passages 38*a*, 38*b*, 78. Upon removal of the retaining member 26, the slide fit configuration between the rod member 22 and the piston bore 30 facilitates relatively easy removal of the rod member 22 from the piston bore 30. Moreover, re-assembly may be performed as described hereinabove with relative ease.

It should be appreciated that when a fluid pressure is exerted on the rod end 18*a* of the piston member 18 to move the piston and rod assembly 14 toward the head end 10*b* of the cylinder assembly 10, the retaining member 26 primarily supports the resulting load to hold the piston and rod assembly 14 together. Conversely, when a fluid pressure is exerted on the head end 18*b* of the piston member 18 to move the piston and rod assembly 14 toward the rod end 10*a* of the cylinder assembly 10, the resulting load on the piston and rod assembly 14 is supported primarily by the piston-shoulder-to-rod-shoulder engagement. Moreover, it should be appreciated that the embodiment shown in FIGS. 1 and 2 may allow substantially the entire cross-sectional area of rod member 22 to engage the piston shoulder 34 at the piston-shoulder-to-rod-shoulder engagement. Thus, the illustrated arrangement may facilitate greater surface area engagement between the rod member 22 and the piston member 18 than various prior art devices. Such increased surface area engagement facilitates greater support and distribution of fluid pressure (e.g., from forces within the head end chamber 88) within the piston-rod joint 15 before materials within the piston and rod assembly 14 approach a material failure threshold.

In an exemplary application of the described apparatus, the cylinder assembly 10 may be used on an earthmoving machine, such as a dozer. For example, the assembly 10 may be configured and arranged on the dozer so that high pressure within the head end chamber 88 causes movement of the piston and rod assembly 10 to position or otherwise move the blade of the dozer. As may be appreciated according to the explanation provided hereinabove, actuating pressures supportable by the assembly 10 (to move the blade of the dozer) may be greater than those supportable by similarly-sized prior art cylinders, which may have reduced-diameter threaded rod ends engaging correspondingly reduced-diameter portions of a piston member.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A piston and rod assembly for use with an actuating device, comprising:

a piston member having a longitudinal bore and first and second retaining passages in communication with and extending away from the bore;

a rod member having a third retaining passage arranged therein, a portion of the rod member being received within the bore of the piston member so that the third retaining passage is arranged within the bore in a longitudinally offset configuration relative at least one of the first and second retaining passages by a predetermined distance; and a retaining member arranged within the first and second retaining passages of the piston member and the third retaining passage of the rod member.

2. The piston and rod assembly of claim 1, wherein the retaining member is configured and arranged within the first and second retaining passages of the piston member and the third retaining passage of the rod member to exert a retaining force on the rod member, the retaining force biasing the portion of the rod member toward the piston member.

3. The piston and rod assembly of claim 2, wherein:

the rod member has a rod shoulder thereon;

the piston member has a piston shoulder thereon; and the rod shoulder and the piston shoulder are biased together by the retaining force.

4. The piston and rod assembly of claim 3, wherein the rod shoulder is formed at an end face of the portion of the rod member; and the piston shoulder is formed within the bore.

5. The piston and rod assembly of claim 1, wherein both the first and second retaining passages in the piston member are longitudinally offset from the third retaining passage in the rod member by the predetermined distance.

6. The piston and rod assembly of claim 1, wherein the predetermined distance is equal to or greater than 0.08 mm.

7. The piston and rod assembly of claim 1, wherein the predetermined distance is in the range of from about 0.08 mm to about 0.1 mm.

8. The piston and rod assembly of claim 1, wherein the offset configuration between the at least one of the first and second retaining passages of the piston member and the third retaining passage of the rod member causes the piston member and the rod member to cooperate to effectuate a pre-load shear stress on the retaining member.

9. The piston and rod assembly of claim 1, wherein the portion of the rod member is sized and configured for a slide fit engagement with the bore of the piston member.

10. The piston and rod assembly of claim 1, wherein a seal is disposed about the circumference of the portion of the rod member and is arranged between the portion of the rod member and the piston member.

11. The piston and rod assembly of claim 10, wherein:

the piston member has a seal groove disposed about the outer circumference thereof;

the first and second retaining passages intersect the seal groove; and a seal is arranged about the outer circumference of the piston member and within the seal groove.

12. The piston and rod assembly of claim 1, wherein the third retaining passage is arranged in an offset configuration relative the first and second retaining passages.

13. The piston and rod assembly of claim 12, wherein the first and second retaining passages are arranged in substantial alignment with each other.

14. The piston and rod assembly of claim 1, wherein the retaining member has a hardened outer surface.

15. The piston and rod assembly of claim 1, wherein the first, second, and third retaining passages are generally cylindrical and have substantially the same internal diameter.

16. The piston and rod assembly of claim 1, wherein:

the bore in the piston member is substantially cylindrical in shape;

the portion of the rod member is substantially cylindrical in shape; and the end face of the portion of the rod member received within the bore is biased by the retaining member into engagement with an internal face of the bore.

17. A piston and rod assembly for use with an actuating device, comprising:

a piston member having a bore therein;

a rod member having a portion thereof arranged within the bore;

a retaining member engaging the piston member and the rod member and configured and arranged to couple the piston member with the rod member;

wherein the piston member and the rod member are configured and arranged relative the retaining member in a longitudinally offset manner by a predetermined distance so as to exert a pre-load shear stress on the retaining member.

18. The piston and rod assembly of claim 17, wherein the portion of the rod member is configured within the bore of the piston member in a slide fit configuration.

19. A method of coupling a piston member having a bore and at least a first retaining passage with a rod member having at least a second retaining passage, comprising:

inserting a portion of the rod member into the bore of the piston member so that the at least a first retaining passage is arranged in a predetermined longitudinal offset configuration relative the at least a second retaining passage;

inserting a substantially rigid retaining member into the at least a first retaining passage and the at least a second retaining passage while substantially maintaining the longitudinal offset configuration.

20. The method of claim 19, wherein the step of inserting a portion of the rod member into the bore of the piston member includes arranging the portion of the rod member within the bore in a slide fit configuration.

21. The method of claim 19, wherein the step of inserting a substantially rigid retaining member into the at least a first retaining passage and the at least a second retaining passage while substantially maintaining the offset configuration includes creating a pre-load sheer stress within the substantially rigid retaining member.

22. A method of coupling a piston member to a rod member, comprising:

inserting a portion of the rod member into a bore of the piston member to create a piston-rod joint;

pre-loading the piston-rod joint by inserting a substantially rigid retaining member into longitudinal offset passages within the rod member and the piston member.

23. The method of claim 22, including arranging the portion of the rod member within the bore of the piston member to create a predetermined offset between the passages within the rod member and the piston member.

24. The method of claim 22, including arranging at least a first passage within the rod member and at least a second passage within the piston member so that when the rod member and the piston member are properly assembled together, a predetermined offset will be established between the at least a first passage and the at least a second passage.

25. The method of claim 24, wherein the predetermined offset creates a desired pre-load stress within the retaining member when the piston member is properly coupled to the rod member.

26. The method of claim 24, wherein the predetermined offset is equal to or greater than 0.08 mm.

27. The method of claim 22, wherein the offset is equal to or less than 0.1 mm.

28. The method of claim 22, wherein the step of inserting a portion of the rod member into a bore of the piston member to create a piston-rod joint includes arranging the portion of the rod member within the bore of the piston member in a slide fit configuration.

29. The method of claim 22, including disassembling the piston-rod joint by removing the retaining member from the passages and removing the portion of the rod member from the bore of the piston member.

30. The method of claim 22, wherein the step of pre-loading the piston-rod joint by inserting a substantially rigid retaining member into offset passages within the rod member and the piston member includes inserting the retaining member into at least a first retaining passage within the piston member and into at least a second retaining passage within the rod member, wherein the at least a second retaining passage is arranged in an offset configuration relative the at least a first retaining passage.

* * * * *

UNITED STATES PATENT AND TRADEMARK OFFICE

CERTIFICATE OF CORRECTION

PATENT NO. : 7,353,749 B2
APPLICATION NO. : 11/106916
DATED : April 8, 2008
INVENTOR(S) : Hamasagar It is certified that error appears in the above-identified patent and that said Letters Patent is hereby corrected as shown below:

Please correct the Claim as follows:
Column 8, line 21, in Claim 27, delete "claim 22," and insert -- claim 26, --.

Signed and Sealed this

Twenty-first Day of October, 2008

JON W. DUDAS
*Director of the United States Patent and Trademark Office*